United States Patent Office 2,954,415
Patented Sept. 27, 1960

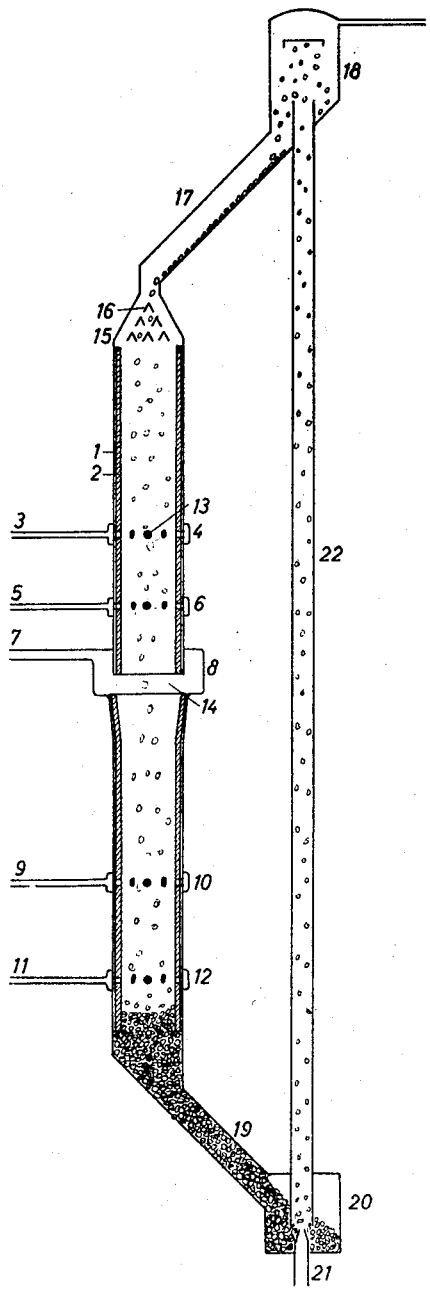

2,954,415

METHOD OF CARRYING OUT CHEMICAL REACTIONS IN THE GASEOUS PHASE AT HIGH TEMPERATURE BY INTERACTION WITH FREELY FALLING CONTACT BODIES PRESENT IN THE GASEOUS PHASE

Haldor Frederik Axel Topsöe, 73 Baunegaardsvej, Hellerup, near Copenhagen, Denmark Filed Dec. 28, 1954, Ser. No. 478,036

Claims priority, application Netherlands Dec. 31, 1953

9 Claims. (Cl. 260—679)

It is well known that chemical reactions taking place in the gaseous phase at high temperature may frequently be carried out advantageously by interaction with contact bodies present in the gaseous stream. The interaction may be catalytical, thermal or consist in the interchange of substance, which interchange may consist simply in the reaction gas depositing a substantance on the contact bodies or in that some substance is given off from the contact bodies to the gaseous phase; thermal interchange will take place when there is a difference between the temperature of the gas and the temperature of the contact bodies and such thermal interchange or heat interchange in many cases is not only desired, but even the main purpose of the contact.

In order to explain the present invention and particularly the meaning of the expression "contact bodies present in the gaseous stream" as used in this connection reference may be had for comparative purposes to the manner, in which such contact bodies are present in the process of catalytical cracking of gas oil carried out by the use of fixed bed, moving bed or the fluidized bed process.

In the two former processes the reaction gas is carried through a container filled completely or partially with a catalyst in the form of small bodies of a size ranging from about 2 to about 6 mm. pebbles, so-called. The designations fixed bed or moving bed refer to the manner in which the heating of the contact bodies and in some cases also the regeneration of the same takes place; regeneration in this connection means the removing of coke, which has precipitated on the bodies during the process, by burning. In the fixed bed process the contact bodies are placed in a fixed position and alternately gaseous hydrocarbon, which it is desired to subject to catalytic cracking and gas (atmospheric air) intended to serve for the regeneration and re-heating of the contact bodies are passed through them. In the moving bed process, on the contrary, the contact material is placed in a container passed by the reaction gas and from the lower part of this container contact material, which has either been covered by coke or as a result of the endothermic nature of the process has been cooled below the desired reaction temperature and which, consequently, it is desired to have regenerated and re-heated, is continuously removed. The contact material thus removed is regenerated and re-heated in another container and then it is returned continuously to the upper part of the former container.

In the fluidized bed method the contact material is powderous. During the treatment of the hydrocarbons as well as during the removal of carbon deposited on the contact material and during the heating of the contact material it is kept in the fluidized condition by introducing gas of comparatively small velocity. The fluidized condition could be thick-phase or thin-phase according to the velocity of the gas and the condition of the powderous material. In the thick-phase fluidized condition the powder material maintains a substantially horizontal surface and presents to the gas passing through it a resistance approximately equal to the hydrostatic pressure in a column of a fluid having the height and specific gravity of the fluidized layer. In the thin-phase fluidized condition, on the contrary, the powderous material is carried away with the gas stream. By using the fluidizing principle the fluidized material may be passed from a container, in which the catalytical treatment of the hydrocarbon is carried out to a container, in which the removal of carbon deposited thereon, and the heating process is carried out, and returned.

The processes described have also in some cases been used on other technical fields than mineral oil chemistry, for instance in the synthetic production of liquid fuel, and in the production of phthalic anhydride from naphthalene. They are, however less adapted for carrying out gaseous reactions, in which particularly high temperatures or particularly short periods of reaction should be made use of.

It is also generally known to treat a gaseous material by allowing bodies of catalysing material or material capable of reacting chemically with the gaseous material to fall feely through the gaseous phase. Thus it is known in the production of phthalic anhydride by partial oxidation of an aromatic hydrocarbon which is an exothermic process taking place at moderate temperature to let bodies of vanadium oxide or other similar catalyst fall freely through a chamber through which a current of a mixture of the hydrocarbon and oxygen moves upwardly.

In all cases known, however, the temperature is limited by the fact that constructional parts are used, which are on all sides surrounded by the hot contact material. Consequently, no temperatures can be used exceeding those that could be endured by the construction materials necessary for producing the constructional parts in question, for instance steel. Lining or coating such constructional parts with refractive ceramic materials or stone materials would generally be of no use under such conditions. Moreover, in the known embodiments of the processes described the reaction time cannot be decreased to periods of time smaller than a few seconds. The processes described are thus inadequate for use in cases where for instance reaction times amounting to a fraction of a second are necessary to control the course of a process.

By way of example of a thermal gaseous phase reaction in which high temperature and short reaction time are required the reaction between nitrogen and oxygen involving the formation of nitrogen oxides may be mentioned. While the original form of this reaction carried out in an electrical arc furnace has almost entirely been replaced by catalytic oxidation of ammonia on a platinum catalyst it has been possible recently to carry out direct oxidation of the nitrogen of the atmospheric air by heating and subsequent fast cooling of the reaction mixture by interchange with contact bodies present in the gaseous stream. For this purpose compact beds of contact bodies are used to alternately heat the reaction gas (atmospheric air) and cool the reaction product.

In such a process, however, the above named disadvantages connected with the use of the fixed bed process will be unavoidable and moreover, it is a considerable disadvantage in this kind of processes that the gaseous stream must very frequently be changed from one direction to the opposite direction.

By way of another example of a process in which high temperatures and short reaction times are desirable the production of acetylene by cracking natural gas may be mentioned. This process takes place at temperatures of 1300–1400° C. and requires a time of reaction which is probably less than ¼ second. Other examples are the production of ethylene from natural gas (ethane), the production of propylene by cracking propane, of butadiene from hydrocarbon mixtures consisting of C₄-chains, the production of aromatic hydrocarbons by cracking, the conversion of hydrocarbons with water vapor with or without catalysis, the production of hydrocyanic acid from the hydrocarbons and ammonia and the production of carbon disulphide from hydrocarbons and sulphur.

The present invention has for its object to make possible such processes or improve the manner in which they are carried out or to effect other processes in which the conditions of reaction are equally difficult to obtain or which cannot be effected in the manners known hitherto without taking serious drawbacks into account.

For this purpose according to the present invention the reaction gas is admitted to a defined stream of contact bodies which are moving in free fall through an appropriate height, the reaction gas moving in the same direction as the bodies, in the opposite direction or at an angle with it, and during the same free fall the contact bodies are first subjected, prior to any contact of them with the reaction gases or the reaction products formed thereby, to heating by interaction with a suitable stream of heating gas supplied to the stream of contact bodies from outside.

The expression that the contact bodies are moving in free fall is to be understood here and in the following part of the specification and claims in the sense that the contact bodies are not supported by or in substantial mechanical interaction, for instance through impact, with other solid bodies.

For the practising of the purposes of the present invention contact bodies having a nominal diameter of 1–10 mm. are generally required.

By admitting the reaction gas to a defined stream of contact bodies in the state of a free fall the temperature at which the interchange of the gas with the contact bodies takes place may be much higher than if the contact bodies were in the state of a compact bed or if they were contacting each other or in contact with supporting or distributing members. Contact bodies in the state of a free fall are in contact substantially only with the gas stream and are consequently capable of enduring substantially higher temperatures. The walls surrounding the gas stream may be lined by refractory material or cooled, the contact bodies moving through the gas stream in free fall being the only means for intentional admission of heat to or removal of heat from the reaction gas. As a result of the condition of movement of the contact bodies through the gas stream the exchange of heat may be considerable and it can be interrupted at any desired degree of precision by removing the reaction gas from the stream of contact bodies at the moment when the discontinuation of the contact is desired. Even the thermal interchange will then be interrupted in the moment when the gaseous stream leaves the stream of contact bodies since the latter are the agents for intentional heat interchange with the gas stream, whereas the temperature of the wall plays an unimportant part.

In the case of contact bodies which do not move or which move as a compact mass descending through a container (fixed bed or moving bed, respectively) these conditions cannot be obtained. Even though it is possible to maintain in the parts of the contact material remote from the walls a considerably higher temperature than that of the walls there will be a transition by degree from the hotter to the colder parts of the contact material dependent on the mutual contact of the bodies and on the contact of the bodies with the wall. This drawback is further aggravated by the fact that processes of this kind must always be carried out as discontinuous alternating processes, which involves periodical temperature oscillation in the contact material.

Prior to their contact with the heating gas the contact bodies may be at a temperature which is as much lower than the temperature at which they are to be introduced in the reaction as may be desired. Consequently, there will be no need for subjecting the contact bodies to any heating in compact bed or at least there is no need for heating them under such conditions to any temperature at which any inconveniences would occur. The contact bodies on the contrary may be stored, distributed and subjected to all necessary mechanical treatment at temperatures which do not directly depend on the reaction temperature.

When carrying out processes involving cracking of hydrocarbons, coke will in most cases deposit upon the contact bodies. Such coke may be utilized in known manner for re-heating the contact bodies by burning. If the carbon deposit is sufficient for re-heating the contact bodies to the desired temperature the heating gas may consequently consist in a stream of air or oxygen. If, however, the amount of coke deposited is too small to maintain the process or if no deposit of carbon will form the amount of heat to be supplied may be produced in known manner by combustion of a fuel gas with air or oxygen or by contacting the bodies with a stream of combustion product obtained by such a combustion. The air, the oxygen, the burning fuel or the hot combustion products are here generally termed combustion gas.

According to an embodiment of the invention the spent heating gas may be wholly or partly withdrawn from the stream of contact bodies prior to contacting the same with the reaction gas or the reaction product thereof, whereby it is obtained that the reaction gas or the reaction product will be contaminated to a correspondingly smaller degree by the heating gas.

Again, in accordance with an embodiment of the invention the stream of contact bodies may be contacted between the part of their path where the heating is effected and the part where the interaction with the reaction gas takes place, with a scavenging or blocking gas the purpose of which is to reduce the possibilities for the heating gas to mix with the reaction gas or the reaction product produced therefrom. The scavenging or blocking gas may be wholly or partly discharged in the points where the scavenging or blocking zone terminates and the reaction zone starts. Thereby the formation of mixtures of the reaction gas or the reaction products thereof with the heating gas will be reduced to a minimum. Moreover, it is possible to use for the scavenging or blocking gas a gaseous material, the mixture of which with the reaction gas or the reaction product thereof would not be undesirable or would produce as little harm as possible.

A scavenging or blocking zone may also be established in the path of the contact bodies after they have passed through the reaction zone, whereby the reaction zone is blocked from the following part of the apparatus and no reaction gas or reaction product will remain in the contact material.

In the following the invention will be more closely explained in connection with the description of a particular embodiment illustrated in the drawing. It should be understood, however, that the invention is in no way restricted to the embodiment thus shown and described, said embodiment being only referred to for illustrative purposes.

The drawing shows schematically a section through an apparatus or equipment by means of which various embodiments of the method according to the present invention may be carried out.

In the drawing the designation 1 represents a vertical kiln lined with a refractory material 2. In different places the kiln has in its wall inlets and outlets 3, 5, 7, 9 and 11 connected to chambers 4, 6, 8, 10 and 12, respectively, surrounding the kiln and being connected with the interior of the kiln by means of openings 13 or a horizontal slit 14 or in other similar manners for instance through nozzles penetrating into the interior of the kiln, where the temperature conditions makes the use of such nozzles possible. In a chamber 15 in the top of the kiln distributors 16 for the contact material admitted through a pipe 17 from a container 18 are placed. The lower end of the kiln 1 is connected by a pipe 19 with a container 20 through the bottom of which a blowing pipe 21 is introduced, the mouth of which is situated just below the lower opening of a transport tube 22 connecting the containers 20 and 18. Contact material will be able to drop from the container 18 through the pipe 17 over the distributors 16 into the kiln 1. After passing the kiln the contact material will descend into the container 20 from which it will be blown up into the container 18 by means of a current of gas introduced through the blow pipe 21. Through the inlet and outlet pipes 3, 5, 7, 9 and 11 various gases may be admitted and discharged according to the nature of the process to be carried out in the kiln.

Thus a heating gas may be admitted through the inlet pipe 3, for instance the combustion products from a steam generator or from a furnace adapted particularly for the purpose in question. The heating gas will pass in an upward direction through the part of the kiln over the inlet 3, the heating zone, where it will meet the contact bodies falling through the kiln and heat them. The heating gas after having delivered most of its heat will leave through the gas discharge tube of the container 18 or through a particular discharge tube not shown in the drawing. The kiln may also be provided with particular burners or nozzles penetrating from the walls into the kiln 1 or other openings for introducing a combustible gas as well as other inlet pipes or openings for introducing combustion air. If the contact bodies are covered as a result of previous use by a deposit of carbon heating in the zone of the kiln over the inlet tube 3 may be obtained by burning such deposit away for which purpose suitably preheated combustion air should be passed through the inlet 3.

By suitably adjusting the length of the heating zone and the admittance of hot gas or combustion air the contact bodies may be heated to the temperature necessary for the reaction.

The reaction gases are admitted through the inlet tube 9 and the reaction product produced therefrom in contact with the heated contact bodies falling through the kiln is discharged through the outlet tube 7. The part of the kiln between the tubes 7 and 9 thus forms a reaction zone.

Between this zone and the heating zone over the inlet tube 3 a scavenging or blocking zone may be formed in various ways. Thus a part of the gases used for heating may be allowed to pass in a downward direction to leave the kiln together with the reaction product from the reaction zone through the outlet 7, or a part of the reaction product may be allowed to flow past the outlet 7 and mix with the heating gas to leave the kiln together with the same, or a third type of gas may be admitted through the inlet tube 5 between the reaction zone and the heating zone. This gas, for instance water vapor, will be able to divide into two streams one passing upwards and one passing downwards. It depends on the pressure prevailing in the two zones how much of this particular scavenging or blocking gas will pass upwards and how much downwards.

The kind of scavenging or blocking method to be used depends on the nature of the process to be carried out. By way of example the first mentioned kind of scavenging or blocking method can be used in the thermal cracking of hydrocarbons in which a part of the reaction gas may be allowed to pass up into the heating zone, where it may partake in the production of heat together with the coke deposited on the contact bodies. By way of example, the production of acetylene from ethane may be mentioned to illustrate a reaction in which the second type of scavenging or blocking may be used. Loss of acetylene to the heating zone is undesirable, whereas no substantial difficulties would be encountered in the further treatment of the reaction product, if the same were mixed with combustion gases. By way of example of a reaction in connection with which the third type of scavenging method may be used, may be mentioned the production of butadiene from butane or butene; loss of butadiene as well as mixing of the reaction products are undesirable, whereas the admixture to the reaction product of a suitable blocking gas, for instance water vapour, will cause little trouble in connection with the further treatment and purification of the butadiene.

In the part of the kiln below the inlet tube 9 a scavenging or blocking zone may be established in a similar manner, for instance by admitting water vapour or some other gas through the tube 11.

In the working scheme described the current in the heating zone or reaction zone or in both may be inverted so that the gases will flow in the same direction as the contact bodies (direct current) Moreover, a cooling zone may be established on the top of the heating zone by extending the kiln further upwardly and re-introducing the reaction products removed through the outlet 7 into the upper part of the kiln through openings in the wall thereof, whereby the contact bodies may be preheated before they arrive to the usual heating zone. This may necessitate establishing an outlet for the combustion product through the wall of the kiln and in some cases an additional blocking zone between the heating zone and the cooling zone. Generally, the places and the order of admitting and discharging the gases may be varied in many ways according to the nature of the reaction to be carried out and the claims for interaction, particularly thermal interaction of the gases with the contact bodies. The novel feature of the process is, however, the admission and withdrawal of the reaction gas to and from contact bodies which are in a state of free fall, which allows reaction conditions, particularly temperatures, to be used in the reaction zone which could not be used in connection with contact bodies placed in compact beds or being in contact with particular supporting or distributing members. Advantages are also obtained with respect to the contact time which can be controlled as desired by choosing suitable places for the inlet- and discharge openings in the kiln. Again, advantages are obtained with respect to the amount of heat transfer per unit of time, which can be controlled and increased to very considerable values by using velocity of fall, since the transfer of heat under otherwise equal conditions increases with the said velocity.

The following example is illustrative of a typical operation of an equipment according to the drawing used for producing acetylene from natural gas, in this case pure methane.

For transferring heat to the gas in this equipment contact bodies consisting of balls, 1 mm. in diameter, of Carborundum circulating at the rate of 50,000 kgs./hour are used. The kiln 1 is lined with refractory bricks. It has a diameter of 500 mm. and a total height of 25 m., the heating zone amounting to 14 m., the scavenging or blocking zone amounting to 2 m., the reaction zone amounting to 8 m. and the lower scavenging zone amounting to 1 m.

For heating the balls during their free fall through the heating zone is used 2400 kgs. of the natural gas each hour or 2600 kgs. oil per hour. In the reaction zone is treated 3600 kgs. gas per hour. In the scavenging or blocking zone between the heating zone and the reaction zone is introduced 1000 kgs. water vapour per hour from which 750 kgs. per hour are leaving the kiln together with the reaction products through the pipe 7.

The gas pressure in the reaction zone is about 0.2 kg./cm.$^2$ in excess of the pressure of the atmosphere.

The temperatures during stationary run of the process will be as follows: The temperature of the contact bodies before they fall into the heating zone: 600° C.; after having passed the heating zone: 1700° C. and after having passed the reaction zone: 700° C. The combustion product leaving the heating zone: 800° C. The transport air after having passed upwardly through the lift: 500° C. The reaction products arriving to the chamber 8 before having been mixed with the blocking vapour: 1200° C.

The time during which the reaction gases pass the temperature interval of 800–1300° C. is 0.4 second, the gases staying 0.3 second in the reaction zone, after which during 0.1 second they are first mixed with water vapour of the scavenging or blocking zone and then have water injected therein, in order to be cooled rapidly down. Cooling takes place during 0.1 second.

The composition of the reaction gas resulting from the treatment under the above named conditions is as follows:

| | Volume percent |
|---|---|
| Hydrogen | 72 |
| Carbon monoxide | 7 |
| Carbon dioxide | 2 |
| Methane | 10 |
| Ethylene | 1 |
| Acetylene | 7 |
| Higher hydrocarbons | 1 |

The yield with respect to acetylene is 24% by weight, calculated upon the natural gas admitted.

On the contact bodies a certain amount of coke will deposit corresponding to 14% by weight of the natural gas used as starting material.

I claim:

1. Method of producing acetylene from methane containing natural gas comprising producing a defined stream of freely falling Carborundum bodies free from support by, and substantial mechanical interaction with, each other and other solid bodies, said stream moving uninterruptedly along a vertical path made up of successive zones consisting of a heating zone, an intermediate blocking zone, a reaction zone and a final blocking zone during the free fall of said bodies, admitting heating gas to said stream at the lower end of said heating zone to heat said bodies, during the free fall of the latter through said heating zone, to a temperature of approximately 1700° C., removing the products of the heating gas from said stream at the upper end of said heating zone, admitting methane containing natural gas to said stream at the lower end of said reaction zone, admitting water vapor to said intermediate blocking zone at the upper end of the latter, and removing the products of the natural gas admitted to said reaction zone and a substantial portion of said water vapor from said stream at the confluence of said reaction and intermediate blocking zones.

2. Method of carrying out chemical reactions in the gaseous phase comprising producing a defined stream of freely falling contact bodies free from support by, and substantial mechanical interaction with, each other and other solid bodies, and moving uninterruptedly along a vertical path having an upper portion constituting a heating zone and a lower portion constituting a reaction zone, heating the freely falling contact bodies of said stream by contacting them with a heating gas in said heating zone, and contacting the stream of thus heated and still freely falling contact bodies with a reaction gas admitted to and withdrawn from the stream of contact bodies in said reaction zone so that heat is there transferred from said bodies to said reaction gas.

3. Method of carrying out chemical reactions in the gaseous phase comprising producing a defined stream of freely falling contact bodies free from support by, and substantial mechanical interaction with, each other and other solid bodies, and moving uninterruptedly along a vertical path having an upper portion constituting a heating zone and a lower portion constituting a reaction zone, heating the freely falling contact bodies of said stream by contacting them with a heating gas in said heating zone, withdrawing the reaction product of the heating gas from the stream of contact bodies, contacting the thus heated and still freely falling contact bodies with a reaction gas admitted to and withdrawn from the stream of contact bodies in said reaction zone so that heat is there transferred from said bodies to said reaction gas.

4. Method of carrying out chemical reactions in the gaseous phase comprising producing a defined stream of freely falling contact bodies free from support by, and substantial mechanical interaction with, each other and other solid bodies, and moving uninterruptedly along a vertical path having an upper portion constituting a heating zone and a lower portion constituting a reaction zone, heating the freely falling contact bodies of said stream by contacting them with a heating gas in said heating zone, removing the reaction product of the heating gas from the stream of contact bodies, admitting a blocking gas at the lower end of said heating zone, removing the blocking gas from said stream, contacting the stream of heated and still freely falling contact bodies with a reaction gas admitted to and withdrawn from the stream of contact bodies in said reaction zone so that heat is there transferred from said bodies to said reaction gas.

5. Method of carrying out chemical reactions in the gaseous phase comprising producing a defined stream of freely falling contact bodies free from support by, and substantial mechanical interaction with, each other and other solid bodies, and moving uninterruptedly along a vertical path having an upper portion constituting a heating zone and a lower portion constituting a reaction zone, heating the freely falling contact bodies of said stream by contacting them with a heating gas in said heating zone, removing the reaction product of the heating gas from the stream of contact bodies, admitting a blocking gas at the lower end of said heating zone, and contacting the stream of heated and still freely falling bodies with a reaction gas flowing in counter-current thereto from an admission point at the lower end of said reaction zone so that heat is there transferred from said bodies to said reaction gas after the falling bodies have passed through the heating gas and blocking gas, and removing the reaction products of the reaction gas and the blocking gas from said stream at a location intermediate said heating and reaction zones.

6. Method of carrying out chemical reactions in the gaseous phase, comprising producing a defined stream of freely falling contact bodies free from support by, and substantial mechanical interaction with each other and other solid bodies, and moving uninterruptedly along a vertical path having an upper portion constituting a heating zone and a lower portion constituting a reaction zone, heating the freely falling contact bodies of said stream by contacting them with a heating gas in said heating zone, contacting the stream of heated and still freely falling contact bodies with a reaction gas admitted to and withdrawn from the stream of contact bodies in said reaction zone so that heat is there transferred from the contact bodies to the reaction gas, and admitting a blocking gas to the freely falling stream of contact bodies at locations intermediate said heating and reaction zones and at the end of said reaction zone, respectively.

7. Method as in claim 2, wherein said heating gas consists of a combustible gas and an oxygen containing gas.

8. Method as in claim 2, wherein said heating gas is an oxygen containing gas, and said contact bodies are covered by an oxidizable deposit.

9. Method as in claim 2, wherein the heating gas is formed by a fuel sprayed into the stream of freely falling contact bodies and an oxygen containing gas.

References Cited in the file of this patent

UNITED STATES PATENTS

| | | |
|---|---|---|
| 1,473,491 | Manning | Nov. 6, 1923 |
| 1,836,325 | James | Dec. 15, 1931 |
| 2,520,096 | Harter | Aug. 22, 1950 |
| 2,526,652 | Garbo | Oct. 24, 1950 |
| 2,548,286 | Bergstrom | Apr. 10, 1951 |
| 2,555,210 | Waddill et al. | May 29, 1951 |
| 2,692,848 | Leffer | Oct. 26, 1954 |
| 2,719,873 | Goins | Oct. 4, 1955 |
| 2,726,938 | Lassiat | Dec. 13, 1955 |
| 2,760,843 | Kollgaard | Aug. 28, 1956 |
| 2,793,987 | Brown et al. | May 28, 1957 |